(12) United States Patent
Wang et al.

(10) Patent No.: US 11,782,723 B1
(45) Date of Patent: Oct. 10, 2023

(54) INTERMEDIATE REPRESENTATION METHOD AND APPARATUS FOR PARALLEL EXECUTION OF GRAPH COMPUTATION

(71) Applicant: ZHEJIANG LAB, Hangzhou (CN)

(72) Inventors: Hongsheng Wang, Hangzhou (CN); Guang Chen, Hangzhou (CN); Lingfang Zeng, Hangzhou (CN); Aimin Pan, Hangzhou (CN)

(73) Assignee: ZHEJIANG LAB, Hangzhou (CN)

(*) Notice: Subject to any disclaimer, the term of this patent is extended or adjusted under 35 U.S.C. 154(b) by 0 days.

(21) Appl. No.: 17/992,830

(22) Filed: Nov. 22, 2022

Related U.S. Application Data

(63) Continuation of application No. PCT/CN2022/124004, filed on Oct. 9, 2022.

(30) Foreign Application Priority Data

Sep. 27, 2022 (CN) .......................... 202211177798.8

(51) Int. Cl.
*G06F 8/40* (2018.01)
*G06F 9/38* (2018.01)
*G06F 8/41* (2018.01)

(52) U.S. Cl.
CPC ............ *G06F 9/3885* (2013.01); *G06F 8/433* (2013.01); *G06F 8/443* (2013.01)

(58) Field of Classification Search
CPC ......... G06F 9/3885; G06F 8/433; G06F 8/443
See application file for complete search history.

(56) References Cited

U.S. PATENT DOCUMENTS

2010/0023731 A1   1/2010 Ito
2018/0203673 A1*  7/2018 Ravishankar ......... G06F 9/4494
(Continued)

FOREIGN PATENT DOCUMENTS

CN   110941494 A   3/2020
CN   111338635 A   6/2020
(Continued)

OTHER PUBLICATIONS

Haichen Shen et al., "Nimble: Efficiently Compiling Dynamic Neural Networks for Model Inference," arXiv, Procedding of the 4th MLSys Conference, 2021, pp. 1-15. Retrieved from <URL: https://arxiv.org/pdf/2006.03031.pdf>. (Year: 2021).*

*Primary Examiner* — Hanh Thi-Minh Bui
(74) *Attorney, Agent, or Firm* — IPRO, PLLC

(57) ABSTRACT

Disclosed are an intermediate representation method and apparatus for parallel execution of graph computation. The method includes the following steps: S1: compiling a neural network into a computational graph on a computer; S2: defining branch states of tensor variables in the computational graph; S3: defining a data dependency relationship of the tensor variables in the computational graph; S4: defining a control dependency relationship of the tensor variables in the computational graph; S5: building a data dependency relationship graph of the tensor variables in the computational graph; S6: building a control dependency relationship graph of the tensor variables in the computational graph; and S7: transforming control dependencies into data dependencies. The present application derives, based on the dependency relationship, a parallel computing method that can execute the branch threads in parallel in the global computational graph, and optimizes the compilation efficiency of the computational graph.

7 Claims, 10 Drawing Sheets

(56) References Cited

U.S. PATENT DOCUMENTS

2018/0349115 A1  12/2018  Zhang
2019/0303762 A1* 10/2019  Sui .......................... G06N 3/04

FOREIGN PATENT DOCUMENTS

| CN | 112767230 A | 5/2021 |
| CN | 114186687 A | 3/2022 |
| CN | 114492772 A | 5/2022 |
| CN | 114936099 A | 8/2022 |
| CN | 115033391 A | 9/2022 |
| WO | 2021190761 A1 | 9/2021 |
| WO | 2022022670 A1 | 2/2022 |

* cited by examiner

INTERMEDIATE REPRESENTATION METHOD AND APPARATUS FOR PARALLEL EXECUTION OF GRAPH COMPUTATION

CROSS REFERENCE TO RELATED APPLICATIONS

The present application claims priority to Chinese Patent Application No. 202211177798.8 filed to the China National Intellectual Property Administration on Sep. 27, 2022 and entitled "Intermediate Representation Method and Apparatus for Parallel Execution of Graph Computation", which is incorporated herein by reference in its entirety.

TECHNICAL FIELD

The present application relates to the technical field of computer systems based on specific computing models, in particular to an intermediate representation method and apparatus for parallel execution of graph computation.

BACKGROUND

With the landing of neural network models in recent years, the technology for neural network compilation becomes more and more important. The existing computational graph compilation technology has not yet analyzed the dependency relationship among tensor variables of different branch threads in a computational graph during execution from a global perspective, and not derived, based on the dependency relationship, a parallel computing method that can execute the branch threads in parallel in the global computational graph.

In view of this, an intermediate representation method and apparatus for parallel execution of graph computation are provided.

SUMMARY

In order to solve the problem of how to analyze the dependency relationship among tensor variables of different branch threads in a computational graph during execution from a global perspective, and to derive, based on the dependency relationship, a parallel computing method that can execute the branch threads in parallel in the global computational graph, the present disclosure provides an intermediate representation method and apparatus for parallel execution of graph computation, thereby improving the execution efficiency of the computational graph during operation and optimizing the compilation efficiency of the computational graph.

The technical solutions adopted by the present application are as follows:

An intermediate representation method for parallel execution of graph computation includes the following steps:

Step S1: compiling a neural network into a computational graph on a computer;

Step S2: defining branch states of tensor variables in the computational graph;

Step S3: defining a data dependency relationship of the tensor variables in the computational graph;

Step S4: defining a control dependency relationship of the tensor variables in the computational graph;

Step S5: building a data dependency relationship graph of the tensor variables in the computational graph;

Step S6: building a control dependency relationship graph of the tensor variables in the computational graph; and Step S7: transforming control dependencies into data dependencies.

Further, step S2 specifically includes the following sub-steps:

Step S21: defining divergent branch states of the tensor variables: when a tensor variable in the computational graph has different values in different parallel threads, the tensor variable is in a divergent branch state; and Step S22: defining unified branch states of the tensor variables: when a tensor variable in the computational graph has the same value in different parallel threads, the tensor variable is in a unified branch state.

Further, step S3 is specifically: when the assignment relationship between an output tensor variable and an input tensor variable that is contained in a node of the computational graph is a relationship expression of the output tensor variable with respect to the input tensor variable, the data of the output tensor variable depends on the input tensor variable.

Further, step S4 specifically includes the following sub-steps:

Step S41: defining branch control variables: each branch control variable is a Boolean type variable, and is a computing node containing a branch instruction operation branch jump; when the value of the branch control variable is true, the execution flow jumps to a sub-graph branch, otherwise, nodes following the computing node containing the branch instruction operation branch jump are executed;

Step S42: defining a control dependency relationship: when the value assigned to a tensor variable depends on the sub-graph branch controlled by the branch control variable, the tensor variable is controlled dependent on the branch control variable;

Step S43: defining a post-dominating relationship between the sub-graph branches of the computational graph: if and only if each path of the execution flow during execution from the sub-graph $B_i$ branch to a terminal node of the computational graph passes through the sub-graph $B_j$ branch, the sub-graph $B_j$ branch post-dominates the sub-graph $B_i$ branch;

Step S44: defining affect regions of the branch control variables: the affect region of a branch control variable starts from the sub-graph branch where the branch control variable is located and ends at the post-dominating sub-graph branch where the branch control variable is located, and the post-dominating sub-graph branch needs to synchronize the threads of different branches diverged at the branch where the branch control variable is located; and Step S45: defining the control dependency relationship: if and only if the tensor variable is located within the affect region of the branch control variable and the tensor variable can be propagated to the post-dominating sub-graph branch, the tensor variable is controlled dependent on the branch control variable, and the post-dominating sub-graph branch implicitly synchronizes the threads on different branches diverged at the branch.

Further, step S5 specifically includes the following sub-steps:

Step S51: creating nodes of the data dependency relationship graph; building a node for each tensor variable in the computational graph in sequence according to the topological structure sequence of the computational graph; and Step S52: creating edges of the data dependency relationship graph; when the data of the tensor variable v depends on the tensor variable u, building a connected edge pointing from the tensor variable u to the tensor variable v, a plurality of the connected edges forming the data dependency relationship graph.

Further, step S6 specifically includes the following sub-steps:

Step S61: analyzing the post-dominating sub-graph branches of the branches where the branch control variables are located;

Step S62: analyzing the affect regions of the branch control variables; and

Step S63: building connected edges in the control dependency relationship graph within the affect regions where the tensor variables are controlled dependent on the branch control variables.

Further, step S7 specifically includes the following sub-steps:

Step S71: amplifying, using the branch control variables, routing selectors correctly defined for the tensor variables;

Step S72: synchronizing the tensor variables of different threads outside the affect regions of the branch control variables; and Step S73: building connected edges for transforming the control dependencies of the tensor variables outside the affect regions of the branch control variables to obtain data dependencies.

Further, in step S72, when the life cycle of a tensor variable is not within the affect region of the branch control variable, the routing selector correctly defined for the tensor variable is amplified using the branch control variable to synchronize the values of the tensor variable that are contained in different branch threads.

The present application further provides an intermediate representation apparatus for parallel execution of graph computation, including a memory and one or more processors, the memory storing executable codes, and the one or more processors executing the executable codes to implement the intermediate representation method for parallel execution of graph computation in any of the foregoing descriptions.

The present application further provides a computer-readable storage medium storing a program that, when executed by a processor, implements the intermediate representation method for parallel execution of graph computation in any of the foregoing descriptions.

The beneficial effects of the present application are as follows: the present application discloses an intermediate representation method and apparatus for parallel execution of graph computation, which analyze the dependency relationship among tensor variables of different branch threads in a computational graph during execution from a global perspective, and derive, based on the dependency relationship, a parallel computing method that can execute the branch threads in parallel in the global computational graph. The present application builds a dependency relationship graph of tensor variables by analyzing the dependency relationship among the tensor variables of different branch threads in the execution process of the computational graph, and provides a compiling technology for intermediate representation methods and apparatuses for parallel execution of graph computation. The present application converts the control dependency into data dependency. In control dependency, the execution state of each branch tensor variable depends on the execution result of different parallel threads. Compared with the control dependency, the data dependency implicitly synchronizes the state of the tensor variable contained by parallel threads on different branches, so that the parallel threads on different branches containing the same tensor variable can execute independently. It not only solves the problem of branch dependence conflict of tensor variables, but also improves the efficiency of parallel execution of operating system used for neural network computation. When developing algorithm models, researchers and engineering users use an optimization model for the intermediate representation method and apparatus for parallel execution of graph computation to optimize the compilation efficiency of the computational graph and promote the development of landing applications of a neural network model in the relationship graph.

DETAILED DESCRIPTION

The following description of at least one exemplary embodiment is in fact illustrative only, and is definitely not intended to limit the present application and the application or use thereof. All other embodiments obtained by those of ordinary skill in the art based on the embodiments in the present application without any creative effort fall within the scope of protection of the present application.

Figure 1:
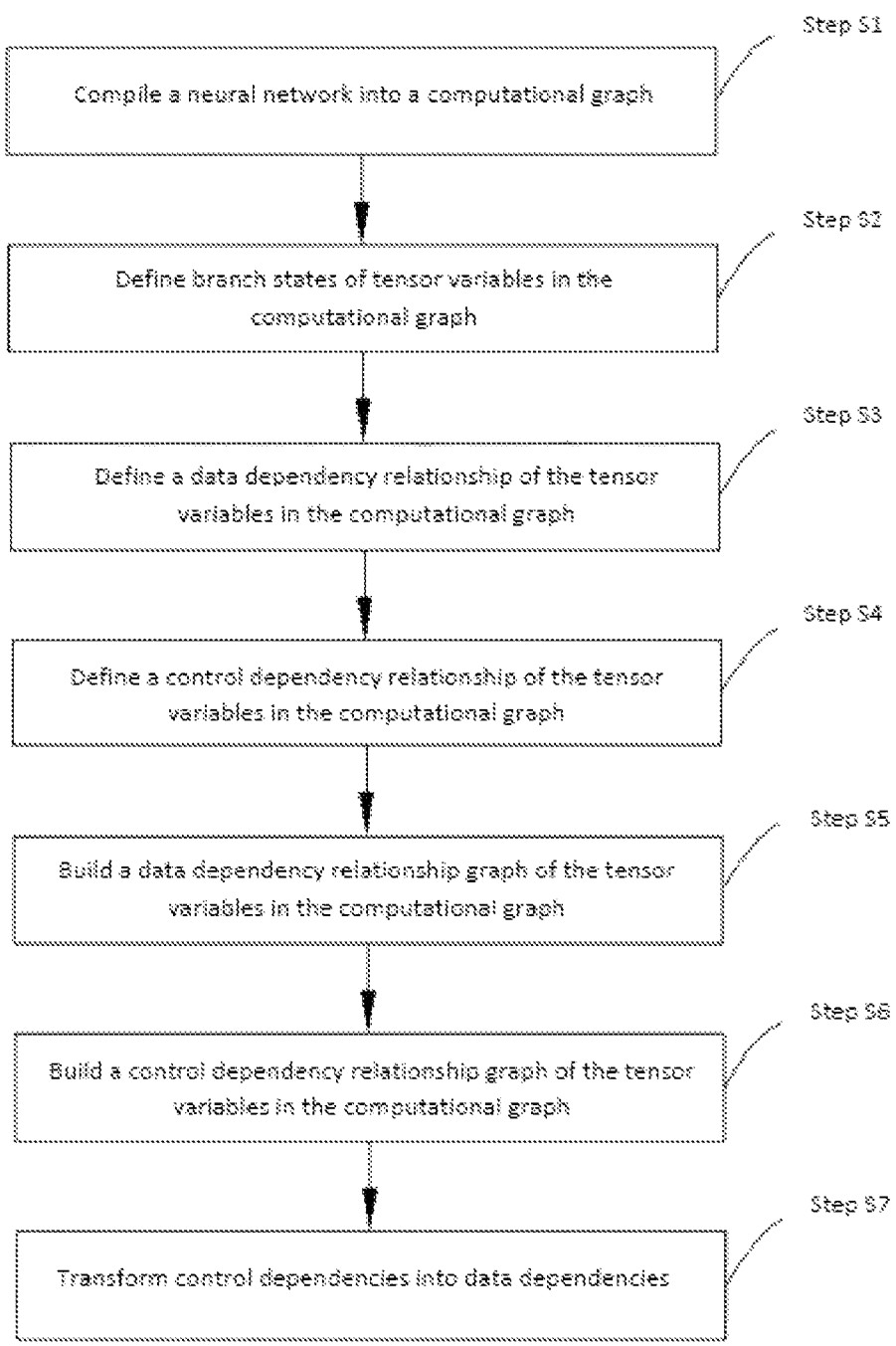
FIG. 1 shows a schematic flowchart of an intermediate representation method for parallel execution of graph computation according to the present application.

With reference to FIG. 1, an intermediate representation method for parallel execution of graph computation includes the following steps:

Step S1: Compile a neural network into a computational graph;

Step S2: Define branch states of tensor variables in the computational graph;

S21: Define divergent branch states of the tensor variables: when a tensor variable in the computational graph has different values in different parallel threads, the tensor variable is in a divergent branch state;

Step S22: Define unified branch states of the tensor variables: when a tensor variable in the computational graph has the same value in different parallel threads, the tensor variable is in a unified branch state.

Step S3: Define a data dependency relationship of the tensor variables in the computational graph;

When the assignment relationship between an output tensor variable and an input tensor variable that is contained in a node of the computational graph is a relationship expression of the output tensor variable with respect to the input tensor variable, the data of the output tensor variable depends on the input tensor variable.

Step S4: Define a control dependency relationship of the tensor variables in the computational graph;

Step S41: Define branch control variables: each branch control variable is a Boolean type variable, and is a computing node containing a branch instruction operation branch jump; when the value of the branch control variable is true, the execution flow jumps to a sub-graph branch, otherwise, nodes following the computing node containing the branch instruction operation branch jump are executed;

Step S42: Define a control dependency relationship: when the value assigned to a tensor variable depends on the sub-graph branch controlled by the branch control variable, the tensor variable is controlled dependent on the branch control variable;

Step S43: Define a post-dominating relationship between the sub-graph branches of the computational graph: if and only if each path of the execution flow during execution from the sub-graph $B_i$ branch to a terminal node of the computational graph passes through the sub-graph $B_j$ branch, the sub-graph $B_j$ branch post-dominates the sub-graph $B_i$ branch;

Step S44: Define affect regions of the branch control variables: the affect region of a branch control variable starts from the sub-graph branch where the branch control variable is located and ends at the post-dominating sub-graph branch where the branch control variable is located, and the post-dominating sub-graph branch needs to synchronize the threads of different branches diverged at the branch where the branch control variable is located;

Step S45: Define the control dependency relationship: if and only if the tensor variable is located within the affect region of the branch control variable and the tensor variable can be propagated to the post-dominating sub-graph branch, the tensor variable is controlled dependent on the branch control variable, and the post-dominating sub-graph branch implicitly synchronizes the threads on different branches diverged at the branch.

Step S5: Build a data dependency relationship graph of the tensor variables in the computational graph;

Step S51: Create nodes of the data dependency relationship graph; build a node for each tensor variable in the computational graph in sequence according to the topological structure sequence of the computational graph;

Step S52: Create edges of the data dependency relationship graph; when the data of the tensor variable v depends on the tensor variable u, build a connected edge pointing from the tensor variable u to the tensor variable v, a plurality of the connected edges forming the data dependency relationship graph.

Step S6: Build a control dependency relationship graph of the tensor variables in the computational graph;

Step S61: Analyze the post-dominating sub-graph branches of the branches where the branch control variables are located;

Step S62: Analyze the affect regions of the branch control variables;

Step S63: Build connected edges in the control dependency relationship graph within the affect regions where the tensor variables are controlled dependent on the branch control variables.

Step S7: Transform control dependencies into data dependencies.

Step S71: Amplify, using the branch control variables, routing selectors correctly defined for the tensor variables;

Step S72: Synchronize the tensor variables of different threads outside the affect regions of the branch control variables;

When the life cycle of a tensor variable is not within the affect region of the branch control variable, the routing selector correctly defined for the tensor variable is amplified using the branch control variable to synchronize the values of the tensor variable that are contained in different branch threads.

Step S73: Build connected edges for transforming the control dependencies of the tensor variables outside the affect regions of the branch control variables to obtain data dependencies.

Figure 2:
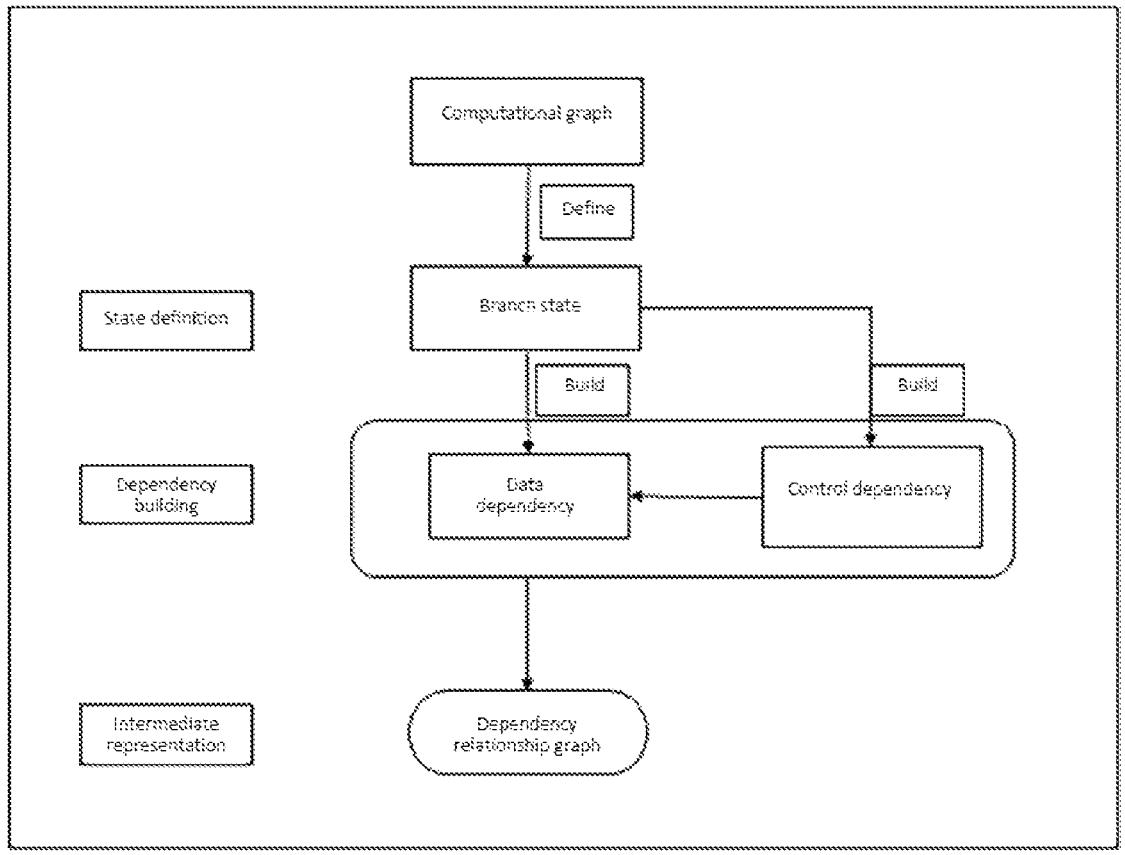
FIG. 2 shows an architecture diagram of the intermediate representation method for parallel execution of graph computation according to an embodiment.
Figure 3:
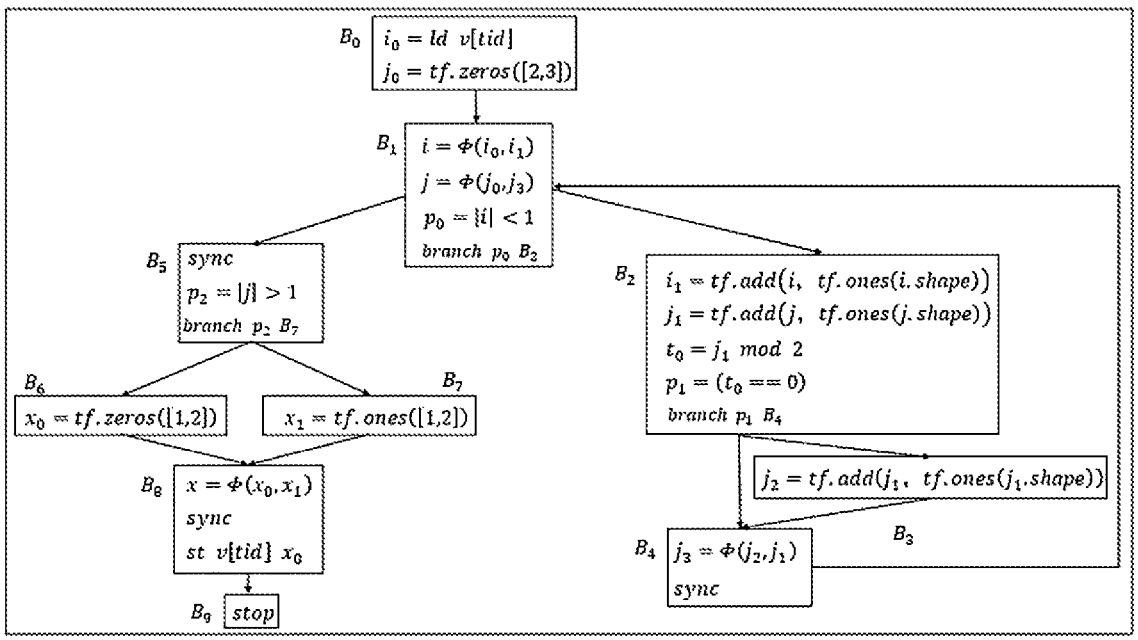
FIG. 3 shows a computational graph for neural network computation according to an embodiment.

Embodiment: FIG. 2 shows an architecture diagram of an intermediate representation method for parallel execution of graph computation. The intermediate representation method for parallel execution of graph computation includes the following steps:

Step S1: Compile a neural network into a computational graph. FIG. 3 shows a computational graph for neural network computation.

The corresponding function meanings in FIG. 3 are as follows:

ld x represents that the value of a tensor variable x in a memory is loaded into a register;

tf.add(x, y) represents a matrix addition operation on the tensor variable x and a tensor variable y;

x=y mod 2 represents that the computed result of taking the remainder of the value of the tensor variable y to 2 is assigned to the tensor variable x;

tf.zeros([x,y]) represents the building of x rows and y columns of tensor variables, the element values of which are 0;

tf.ones([x,y]) represents the building of x rows and y columns of tensor variables, the element values of which are 1;

|x| represents a modulus of the tensor variable x;

$x=\Phi(x_i, x_j)$ represents a routing selector correctly defined for the tensor variable $x_i$ and the tensor variable $x_j$ with respect to the tensor variable x;

st x y represents that the value of the tensor variable y in the register is stored into the tensor variable x in the memory;

$p_i$=Boolean type expression: $p_i$ represents a branch control variable, which is a Boolean type variable;

branch $p_i$ $B_i$ represents a branch jump operation, indicating that the execution flow jumps to the branch $B_i$ when the value of the branch control variable $p_i$ is true;

sync represents that, for sub-graphs of different branches placed on different parallel threads for execution, any thread must wait until all threads reach here before continuing to execute subsequent nodes, where the sync is a synchronous representation of parallel computation;

stop represents a terminal node of the computational graph.

Step S2: Define branch states of tensor variables in the computational graph;

S21: Define divergent branch states of the tensor variables: when a tensor variable in the computational graph has different values in different parallel threads, the tensor variable is in a divergent branch state;

Step S22: Define unified branch states of the tensor variables: when a tensor variable in the computational graph has the same value in different parallel threads, the tensor variable is in a unified branch state.

Step S3: Define a data dependency relationship of the tensor variables in the computational graph;

When the assignment relationship between an output tensor variable and an input tensor variable that is contained in a node of the computational graph is a relationship expression of the output tensor variable with respect to the input tensor variable, the data of the output tensor variable depends on the input tensor variable.

If the node of the computational graph contains a tensor variable v, and the expression of the assignment relationship between $v_1$ and $v_2$ is $v=f(v_1,v_2)$, the data of the tensor variable v depends on the tensor variables $v_1$ and $v_2$.

Figure 4:
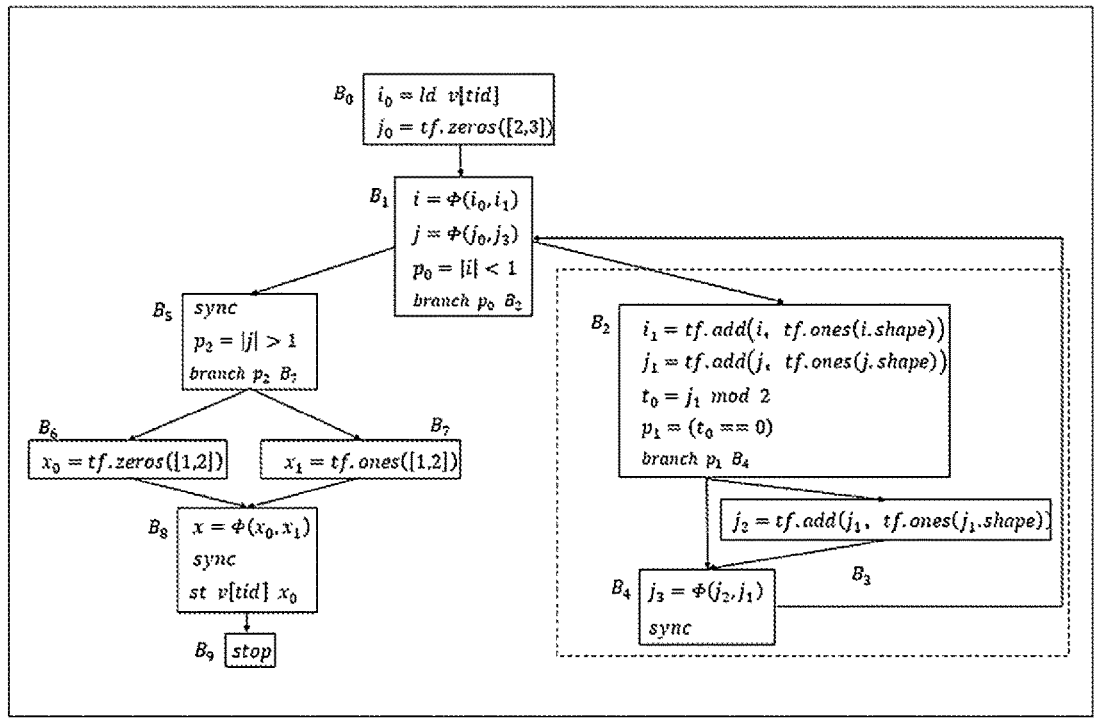
FIG. 4 shows that a sub-graph $B_4$ of the computational graph post-dominates a sub-graph $B_2$ according to an embodiment.

Step S4: Define a control dependency relationship of the tensor variables in the computational graph;

Step S41: Define branch control variables: the branch control variable $p_i$ is a Boolean type variable, and is a computing node containing a branch instruction operation branch jump branch $p_i$ $B_i$; when the value of the branch control variable $p_i$ is true, the execution flow jumps to a sub-graph $B_i$ branch, otherwise, nodes following the computing node containing the branch instruction operation branch jump are executed;

Step S42: Define a control dependency relationship: when the value assigned to the tensor variable v depends on the sub-graph branch controlled by the branch control variable $p_i$, the tensor variable v is controlled dependent on the branch control variable $p_i$;

Step S43: Define a post-dominating relationship between the sub-graph branches of the computational graph: if and only if each path of the execution flow during execution from the sub-graph $B_i$ branch to a terminal node of the computational graph passes through the sub-graph $B_j$ branch, the sub-graph $B_j$ branch post-dominates the sub-graph $B_i$ branch;

FIG. 4 shows the post-dominating relationship between sub-graphs of the computational graph. The sub-graph $B_4$ branch of the computational graph post-dominates the sub-graph $B_2$ branch, so the sub-graph $B_4$ branch of the computational graph needs to synchronize threads of different branches diverged at the sub-graph $B_2$ branch.

Figure 5:
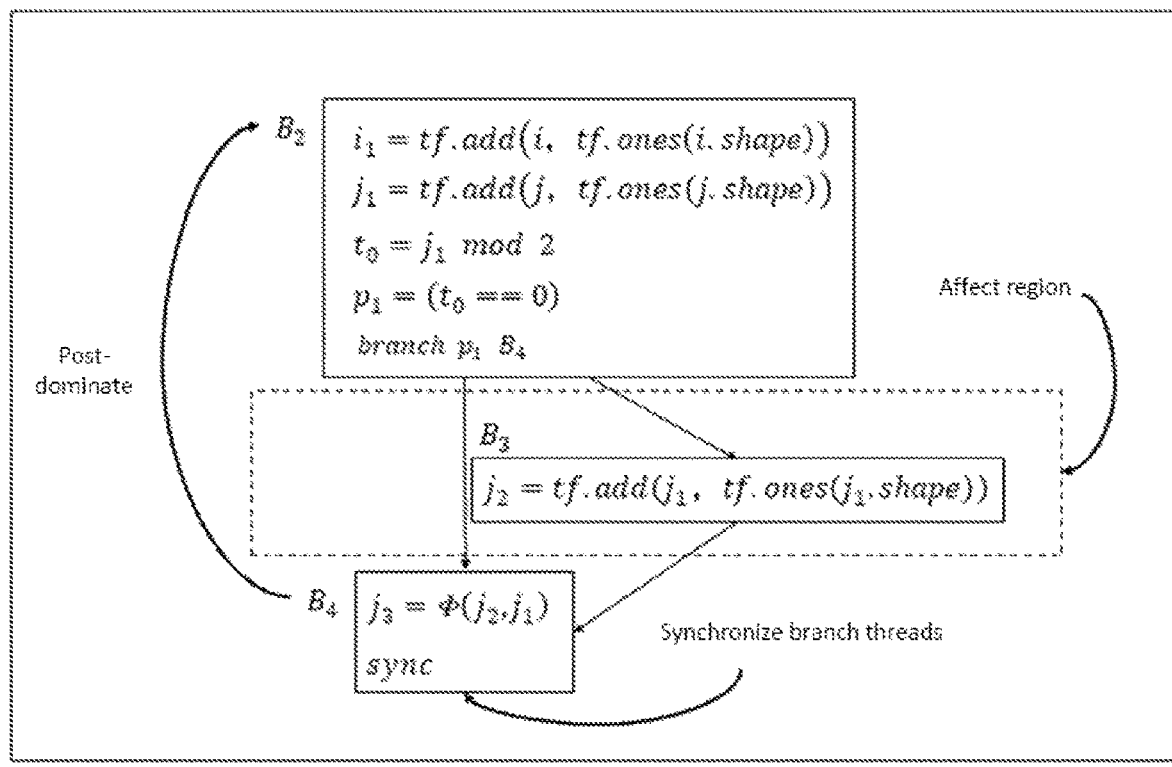
FIG. 5 shows an affect region of a branch control variable according to an embodiment.

Step S44: Define affect regions of the branch control variables: the affect region of a branch control variable starts from the sub-graph branch where the branch control variable is located and ends at the post-dominating sub-graph branch where the branch control variable is located, and the post-dominating sub-graph branch needs to synchronize the threads of different branches diverged at the branch where the branch control variable is located;

FIG. 5 shows an affect region of a branch control variable. The sub-graph $B_4$ branch of the computational graph post-dominates the sub-graph $B_2$ branch, and the branch control variable $p_1$ controls different threads defined by the tensor variable j with respect to $j_1$ and $j_2$. Therefore, the affect region of the branch control variable $p_1$ is as shown in the dashed box in FIG. 4, and the post-dominating sub-graph $B_4$ branch needs to synchronize different threads diverged at the sub-graph $B_2$ branch where the branch control variable $p_1$ is located, which are defined by the tensor variable j with respect to variables $j_1$ and $j_2$, such as the synchronous branch threads shown in FIG. 4.

Figure 6:
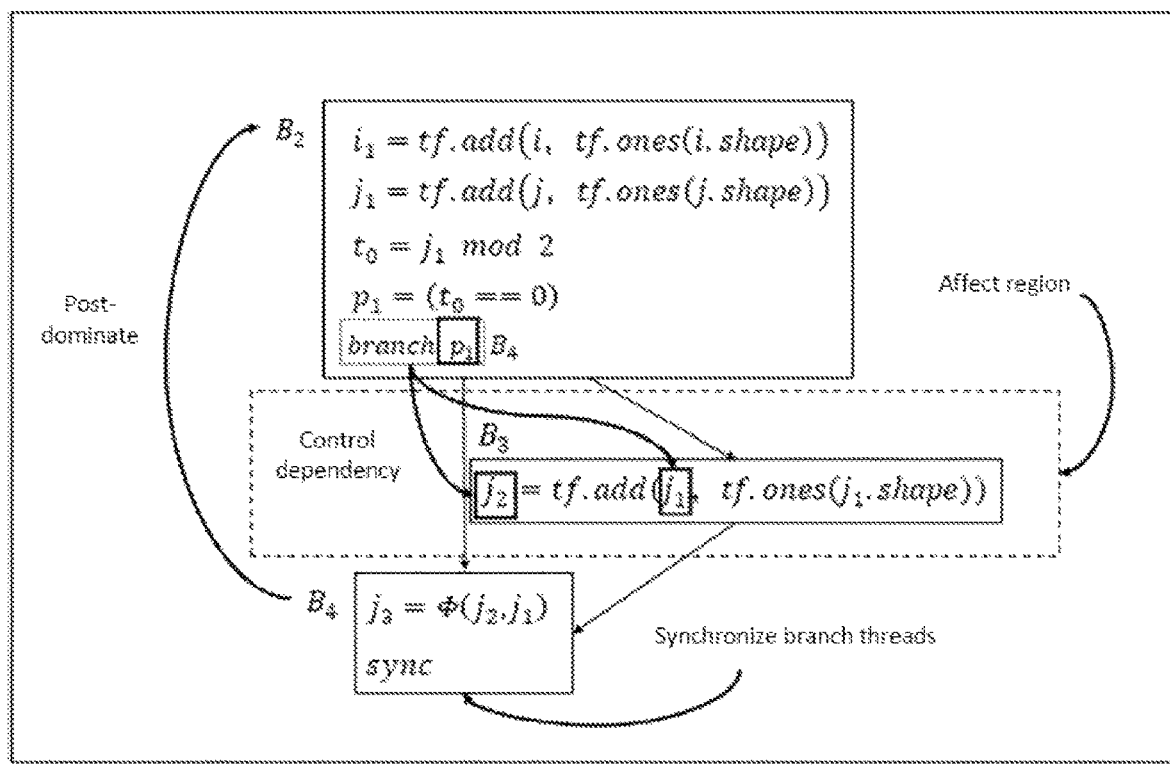
FIG. 6 shows that tensor variables $j_1$ and $j_2$ are respectively controlled dependent on a branch control variable $p_1$ according to an embodiment.

Step S45: Define the control dependency relationship: if and only if the tensor variable v is located within the affect region of the branch control variable $p_i$ and the tensor variable v can be propagated to the post-dominating sub-graph $B_j$ branch, the control of the tensor variable v depends on the branch control variable $p_i$, and the post-dominating sub-graph branch $B_j$ implicitly synchronizes the threads on different branches diverged at the branch. FIG. 6 shows that the tensor variables $j_1$ and $j_2$ within the affect region of the branch control variable $p_1$ are respectively controlled dependent on the branch control variable $p_1$.

Figure 7:
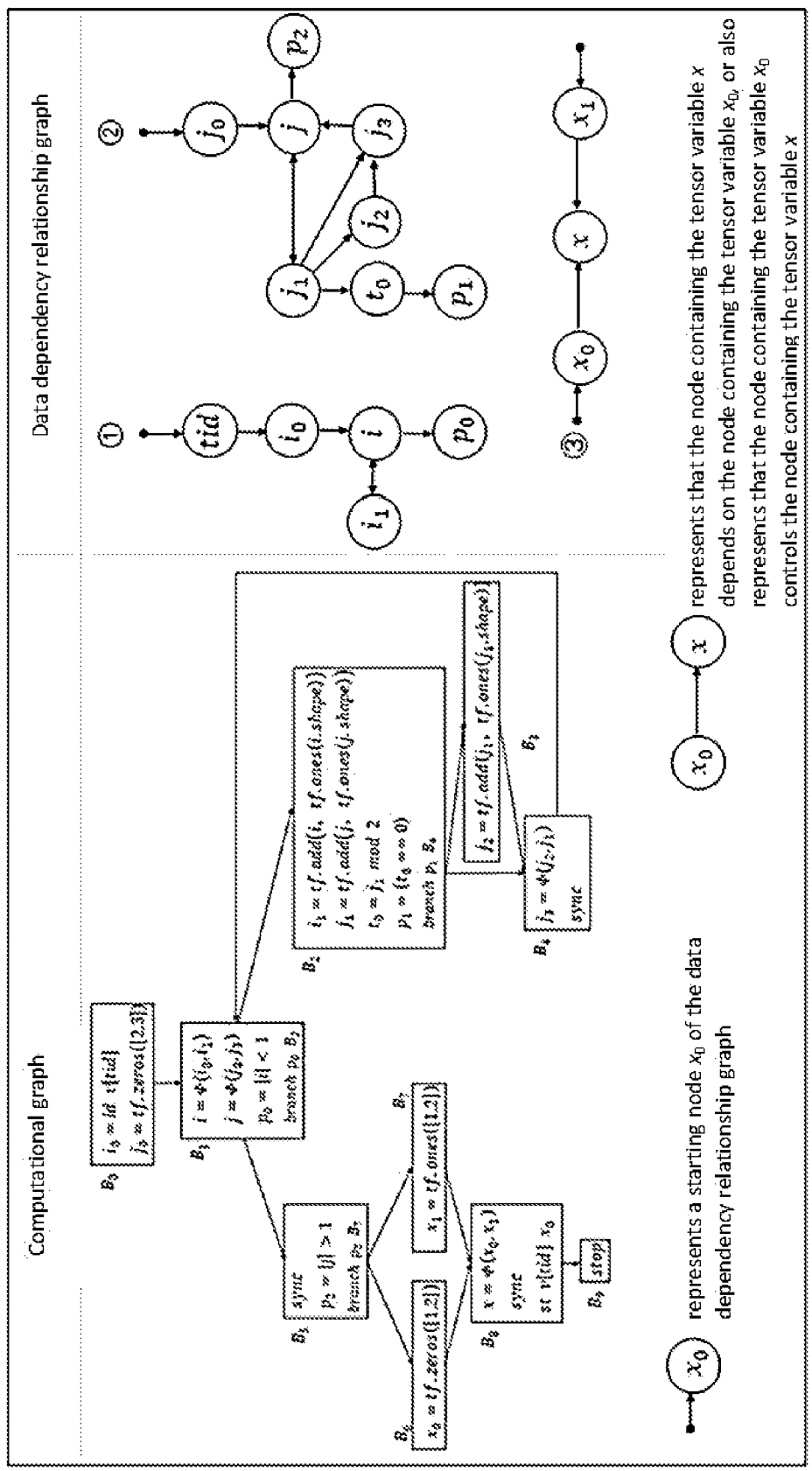
FIG. 7 shows the building of a data dependency relationship graph according to an embodiment.

Refer to FIG. 7. Step S5: Build a data dependency relationship graph of the tensor variables in the computational graph;

Step S51: Create nodes of the data dependency relationship graph; build a node for each tensor variable in the computational graph in sequence according to the topological structure sequence of the computational graph;

Step S52: Create edges of the data dependency relationship graph; when the data of the tensor variable v depends on the tensor variable u, build a connected edge pointing from the tensor variable u to the tensor variable v, a plurality of the connected edges forming the data dependency relationship graph;

First, build a data dependency relationship sub-graph ①: the execution flow of the computational graph flows through each computing node of the computational graph in sequence according to the topological structure of the computational graph. The execution flow of the computational graph begins to run from a first sub-graph $B_0$ of the computational graph, and the computing node $i_0$=Id v[tid] indicates that the tensor variable $i_0$ depends on the starting node tid of the data dependency sub-graph ①, that is, the tensor variable tid controls the tensor variable $i_0$, so a data dependency relationship edge tid→$i_0$ of the tensor variable $i_0$ dependent on the tensor variable tid is built.

When the execution flow of the computational graph runs to a second sub-graph $B_1$, the computing node i=0($i_0$,$i_1$) indicates that the tensor variables $i_0$ and $i_1$ control the tensor variable i, that is, the tensor variable i depends on the tensor variables $i_0$ and $i_1$, so data dependency relationship edges $i_0$→i and $i_1$→i of the tensor variable i dependent on the tensor variables $i_0$ and $i_1$ are built.

The computing node $p_0$=|i|<1 indicates that the tensor variable i controls the tensor variable $p_0$. that is, the tensor variable $p_0$ dependent on the tensor variable i, so a data dependency relationship edge i→$p_0$ of the tensor variable $p_0$ dependent on the tensor variable i is built.

When the execution flow of the computational graph runs to a third sub-graph $B_2$, the computing node $i_1$=tf.add(i, tf.ones(i.shape)) indicates that the tensor variable i controls the tensor variable $i_1$, that is, the tensor variable $i_1$ depends on the tensor variable i, so a data dependency relationship edge i→$i_2$ of the tensor variable $i_1$ dependent on the tensor variable i is built.

Second, build a data dependency relationship sub-graph ②: the execution flow of the computational graph flows through each computing node of the computational graph in sequence according to the topological structure of the computational graph. When the execution flow of the computational graph runs to the second sub-graph $B_1$, the computing node $j=\Phi(j_0,j_3)$ indicates that the tensor variables $j_0$ and $j_3$ control the tensor variable j, that is, the tensor variable j depends on the tensor variables $j_0$ and $j_3$, so data dependency relationship edges $j_0 \rightarrow j$ and $j_3 \rightarrow j$ of the tensor variable j dependent on the tensor variables $j_0$ and $j_3$ are built.

When the execution flow of the computational graph runs to the third sub-graph $B_2$, the computing node $j_1$=tf.add(j, tf.ones(j.shape)) indicates that the tensor variable j controls the tensor variable $j_1$, that is, the tensor variable $j_1$ depends on the tensor variable j, so a data dependency relationship edge $j \rightarrow j_1$ of the tensor variable $j_1$ dependent on the tensor variable j is built.

The computing node $t_0=j_1$ mod 2 indicates that the tensor variable $j_1$ controls the tensor variable $t_0$, that is, the tensor variable to depends on the tensor variable $j_1$, so a data dependency relationship edge $j_1 \rightarrow t_0$ of the tensor variable $t_0$ dependent on the tensor variable $j_1$ is built.

The computing node $p_1=(t_0==0)$ indicates that the tensor variable $t_0$ controls the tensor variable $p_1$, that is, the tensor variable $p_1$ depends on the tensor variable $t_0$, so a data dependency relationship edge $t_0 \rightarrow p_1$ of the tensor variable $p_1$ dependent on the tensor variable $t_0$ is built.

When the execution flow of the computational graph runs to a fourth sub-graph $B_3$, the computing node $j_2$=tf.add($j_1$, tf.ones($j_1$.shape)) indicates that the tensor variable $j_1$ controls the tensor variable $j_2$, that is, the tensor variable $j_2$ depends on the tensor variable $j_1$, so a data dependency relationship edge $j_1 \rightarrow j_2$ of the tensor variable $j_2$ dependent on the tensor variable $j_1$ is built.

When the execution flow of the computational graph runs to a fifth sub-graph $B_4$, the computing node $j_3=\Phi(j_2,j_1)$ indicates that the tensor variables $j_2$ and $j_1$ control the tensor variable $j_3$, that is, the tensor variable $j_3$ depends on the tensor variables $j_2$ and $j_1$, so data dependency relationship edges $j_2 \rightarrow j_3$ and $j_1 \rightarrow j_3$ of the tensor variable $j_3$ dependent on the tensor variables $j_2$ and $j_1$ are built.

When the execution flow of the computational graph runs to a sixth sub-graph $B_5$, the computing node $p_2=|j|>1$ indicates that the tensor variable j controls the tensor variable $p_2$, that is, the tensor variable $p_2$ depends on the tensor variable j, so a data dependency relationship edge $j \rightarrow p_2$ of the tensor variable $p_2$ dependent on the tensor variable j is built.

Third, build a data dependency relationship sub-graph ③ : the execution flow of the computational graph flows through each computing node of the computational graph in sequence according to the topological structure of the computational graph. When the execution flow of the computational graph runs to a ninth sub-graph $B_8$, the computing node $x=\Phi(x_0,x_1)$ indicates that the tensor variables $x_0$ and $x_1$ control the tensor variable x, that is, the tensor variable x depends on the tensor variables $x_0$ and $x_1$, so data dependency relationship edges $x_0 \rightarrow x$ and $x_1 \rightarrow x$ of the tensor variable x dependent on the tensor variables $x_0$ and $x_1$ are built.

Figure 8:
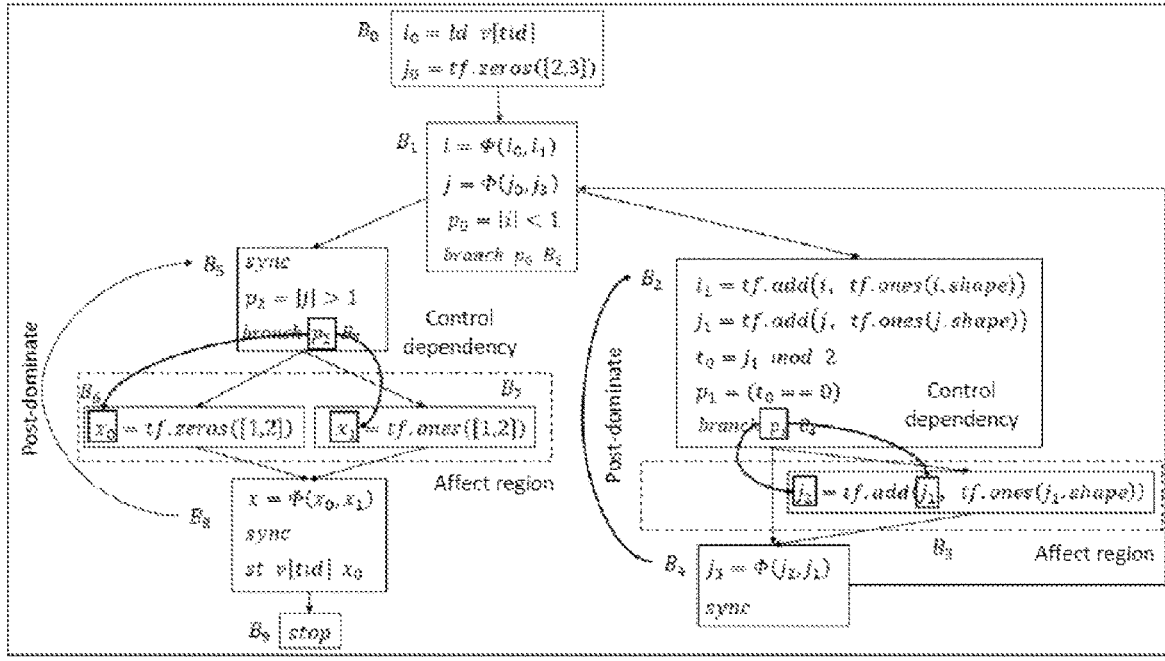
FIG. 8 shows the building of a control dependency relationship graph of tensor variables in the computational graph according to an embodiment.

Step S6: Build a control dependency relationship graph of the tensor variables in the computational graph;

Step S61: Analyze the post-dominating sub-graph branches of the branches where the branch control variables are located;

Step S62: Analyze the affect regions of the branch control variables;

Step S63: Build connected edges in the control dependency relationship graph within the affect regions where the tensor variables control and depend on the branch control variables;

FIG. 8 shows a control dependency relationship graph for building tensor variables in a computational graph. The sub-graph branch $B_4$ of the computational graph post-dominates the sub-graph $B_2$, where both tensor variables $j_1$ and $j_2$ in the affect region of the branch control variable $p_1$ are controlled dependent on the branch control variable $p_1$. Similarly, the sub-graph branch $B_8$ of the computational graph post-dominates the sub-graph $B_5$, where both tensor variables $x_0$ and $x_1$ in the affect region of the branch control variable $p_2$ are controlled dependent on the branch control variable $p_2$.

Step S7: Transform control dependencies into data dependencies.

Figure 9:
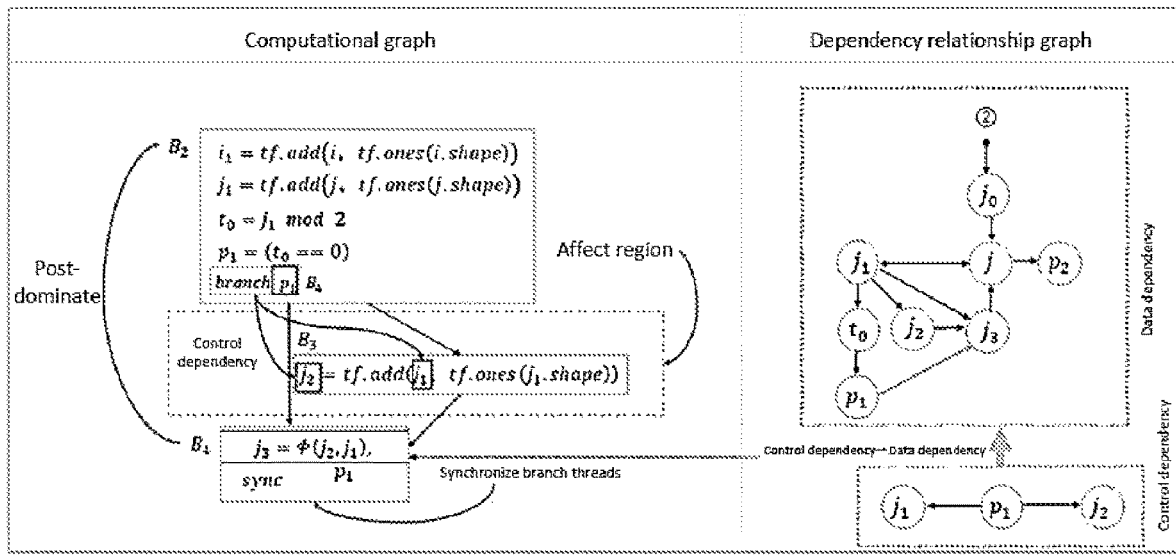
FIG. 9 shows a process of transforming control dependencies into data dependencies according to an embodiment.

Step S71: Amplify, using the branch control variables, routing selectors correctly defined for the tensor variables;

FIG. 9 shows a process of transforming control dependencies into data dependencies. The routing selector $\Phi(j_2,j_1)$ correctly defined for the tensor variables $j_1$ and $j_2$ with respect to the tensor variable j is amplified using the branch control variable $p_1$, the branch control variable $p_1$ is added to the routing selector $\Phi(j_2,j_1)$, and the routing selector is amplified into $j_3=\Phi(j_2,j_1),p_1$. Therefore, a new data dependency relationship of the branch control variable $p_1$ dependent on the tensor variable $j_3$ is built between the tensor variables $j_1$ and $j_2$ and the branch control variable $p_1$.

Figure 10:
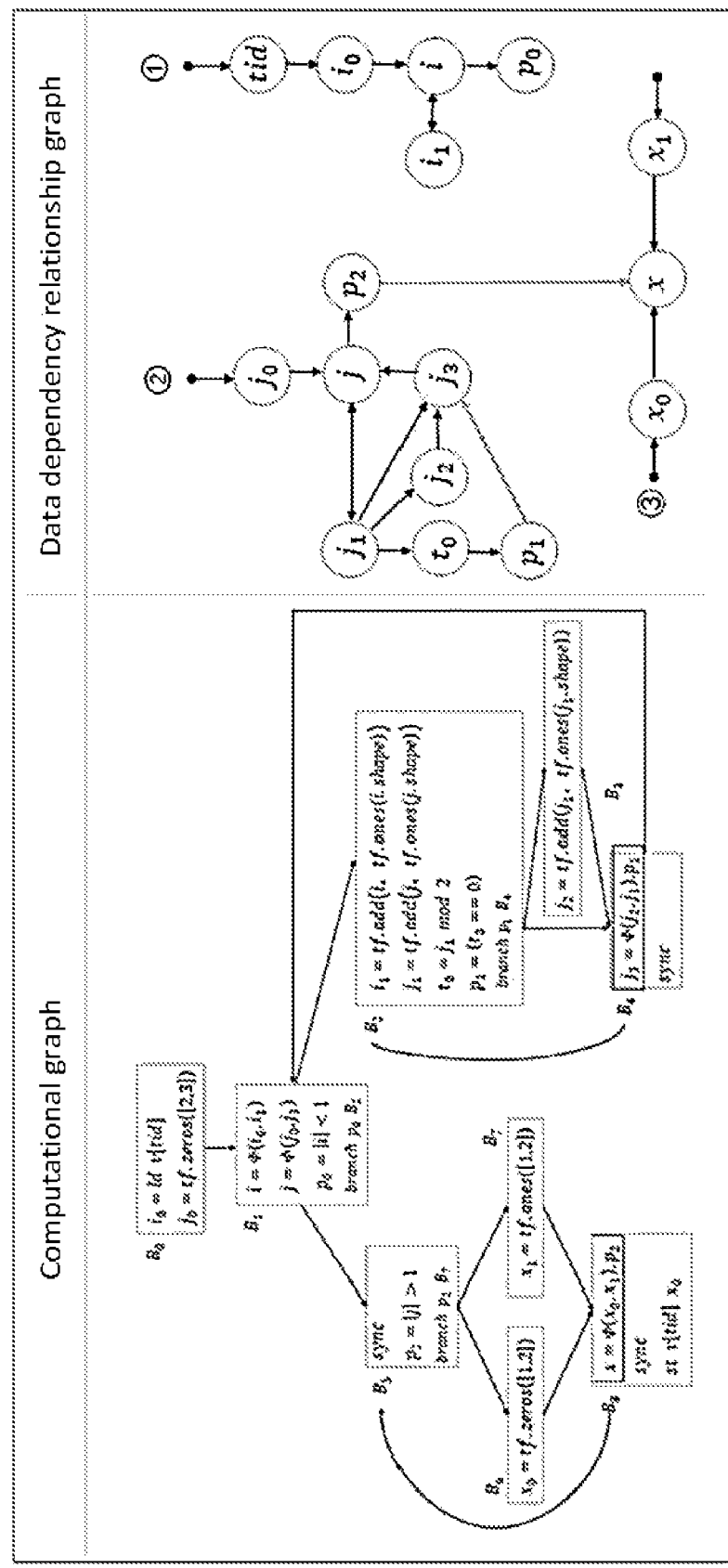
FIG. 10 shows transforming control dependencies of a global computational graph into data dependencies according to an embodiment.

FIG. 10 shows a process of transforming control dependencies of a global computational graph into data dependencies. Because the sub-graph $B_8$ branch of the computational graph post-dominates the sub-graph $B_5$, the routing selector $\Phi(x_0,x_1)$ correctly defined for the tensor variables $x_0$ and $x_1$ with respect to the tensor variable x is amplified using the branch control variable $p_2$, the branch control variable $p_2$ is added to the routing selector $\Phi(x_0,x_1)$, and the routing selector is amplified into $x=\Phi(x_0,x_1)p_2$. Therefore, a new data dependency relationship of the branch control variable $p_2$ dependent on the tensor variable x is built between the tensor variables $x_0$ and $x_1$ and the branch control variable $p_2$.

Step S72: Synchronize the tensor variables of different threads outside the affect regions of the branch control variables;

When the life cycle of the tensor variable j is not within the affect region of the branch control variable $p_0$, the routing selector $j_4\Phi(j),p_0$ correctly defined for the tensor variable is amplified using the branch control variable to synchronize the values of the tensor variable j that are contained in different branch threads.

Figure 11:
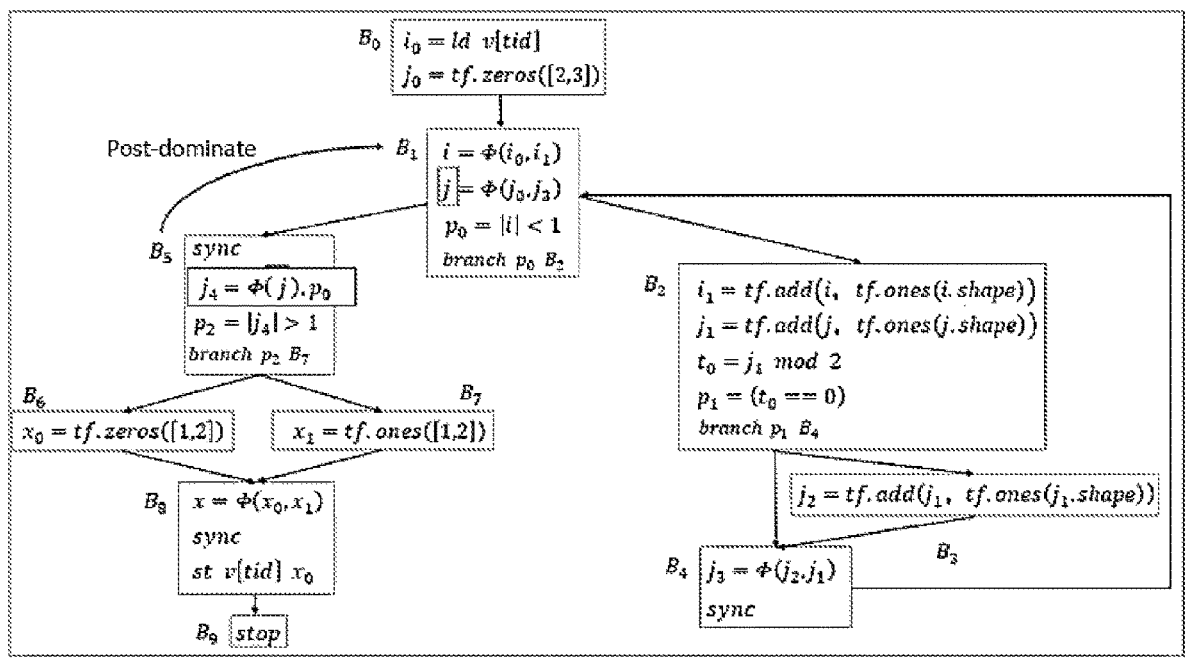
FIG. 11 shows the synchronization of tensor variables of different threads outside the affect regions of the branch control variables according to an embodiment.

FIG. 11 shows a process of synchronizing the tensor variable j of different threads outside the affect region of the branch control variable. First, a unary routing selector $j_4=\Phi(j)$ correctly defined for the tensor variable j is interpolated to segment the life cycle of the tensor variable j and generate a tensor variable $j_4$. Thus, the values of the tensor variable j that are contained in different branch threads controlled by the branch control variable $p_0$ are synchronized using the tensor variable $J_4$ obtained by the segmentation. Meanwhile, the sub-graph $B_5$ of the computational graph post-dominates the sub-graph $B_1$.

Figure 12:
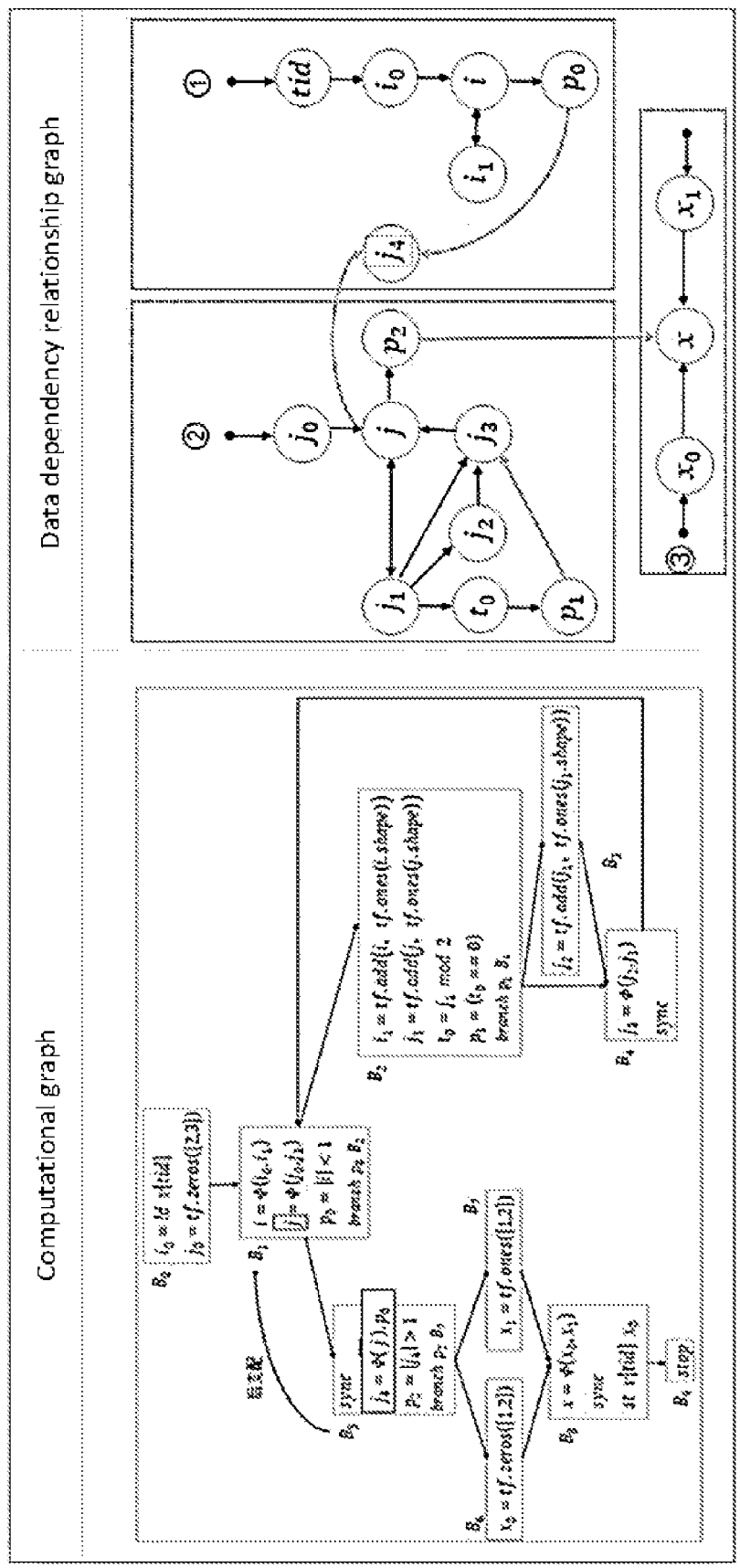
FIG. 12 shows the building of connected edges for transforming data dependencies outside the affect regions of the branch control variables according to an embodiment.

Step S73: Build connected edges for transforming the control dependencies of the tensor variables outside the affect regions of the branch control variables to obtain data dependencies; FIG. 12 shows a process of building a connected edge $j \rightarrow j_4 \leftarrow p_0$ for transforming the control dependency of the tensor variable j outside the affect region of the branch control variable $p_0$ to obtain a data dependency. The connected edge $j \rightarrow j_4 \leftarrow p_0$ for transforming the control dependency of the tensor variable outside the affect region of the branch control variable to obtain a data dependency is built according to the amplification node $j_4=\Phi(j),p_0$ of the routing selector, interpolated to the synchronous branch threads in the foregoing step, for the tensor variable j.

The present application builds a dependency relationship graph of tensor variables by analyzing the dependency relationship among the tensor variables of different branch threads in the execution process of the computational graph, and provides a compiling technology for intermediate representation methods and apparatuses for parallel execution of graph computation. The present application converts the control dependency into data dependency. In control dependency, the execution state of each branch tensor variable depends on the execution result of different parallel threads. Compared with the control dependency, the data dependency implicitly synchronizes the state of the tensor variable contained by parallel threads on different branches, so that the parallel threads on different branches containing the same tensor variable can execute independently. It not only solves the problem of branch dependence conflict of tensor variables, but also improves the efficiency of parallel execution of operating system used for neural network computation. When developing algorithm models, researchers and engineering users use an optimization model for the intermediate representation method and apparatus for parallel execution of graph computation to optimize the compilation efficiency of the computational graph and promote the development of landing applications of a neural network model in the relationship graph.

Corresponding to the foregoing embodiment of the intermediate representation method for parallel execution of graph computation, the present application further provides an embodiment of an intermediate representation apparatus for parallel execution of graph computation.

Figure 13:
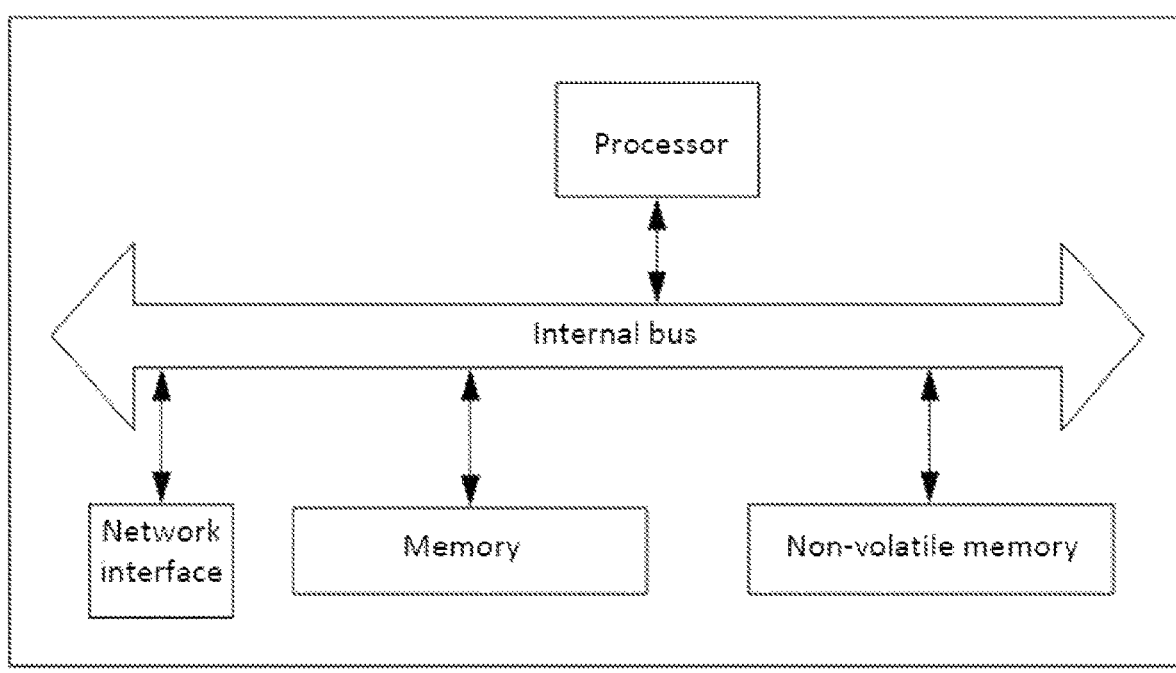
FIG. 13 shows a schematic structural diagram of an intermediate representation apparatus for parallel execution of graph computation according to the present application.

With reference to FIG. 13, the intermediate representation apparatus for parallel execution of graph computation, provided by the embodiment of the present application, includes a memory and one or more processors, the memory storing executable codes, and the one or more processors executing the executable codes to implement the intermediate representation method for parallel execution of graph computation in the foregoing embodiment.

The embodiment of the intermediate representation apparatus for parallel execution of graph computation according to the present application may be applied to any device having data processing capability, which may be a device or apparatus such as a computer. The embodiment of the apparatus may be implemented by software, hardware, or by a combination of hardware and software. Taking the software implementation as an example, the logical apparatus is formed by reading corresponding computer program instructions in a non-volatile memory into a memory through a processor of any device having data processing capability where the apparatus is located. From the hardware level, as shown in FIG. 13, which is a hardware structure diagram of any device having data processing capability where the intermediate representation apparatus for parallel execution of graph computation is located, in addition to the processor, memory, network interface, and non-volatile memory shown in FIG. 13, the any device having data processing capability where the apparatus of the embodiment is located generally may further include other hardware according to the actual functions thereof, and details are not described herein again.

The implementation processes of the functions and effects of the units in the foregoing apparatus are detailed in the implementation processes of the corresponding steps in the foregoing method, and details are not described herein again.

The embodiment of the apparatus substantially corresponds to the embodiment of the method, so relevant parts may refer to the parts of the embodiment of the method. The apparatus examples described above are merely illustrative. The units described as separate components may or may not be physically separated, and the components displayed as units may or may not be physical units, that is, they may be located in one place, or may be distributed to a plurality of network units. Some or all of the modules may be selected according to actual needs to achieve the objectives of the solutions of the present application. Those of ordinary skill in the art can understand and implement without any creative effort.

An embodiment of the present application further provides a computer-readable storage medium storing a program that, when executed by a processor, implements the intermediate representation method for parallel execution of graph computation in the foregoing embodiment.

The computer-readable storage medium may be an internal storage unit of any device having data processing capability descried in any of the foregoing embodiments, such as a hard disk or a memory. The computer-readable storage medium may also be an external storage device of any device having data processing capability, such as a plug-in hard disk, a Smart Media Card (SMC), an SD card, or a flash card equipped on the device. Further, the computer-readable storage medium may further include both an internal storage unit of any device having data processing capability and an external storage device. The computer-readable storage medium is used to store the computer program and other programs and data required by the device having data processing capability, and may also be used to temporarily store data that has been output or will be output.

Described above are only the preferred embodiments of the present application, and are not intended to limit the present application. The present application may have various modifications and variations for those skilled in the art. Any modification, equivalent substitution or improvement made within the spirit and principle of the present invention shall fall into the protection scope of the present invention.

What is claimed is:

1. An intermediate representation method for parallel execution of graph computation, comprising:
   compiling a neural network into a computational graph on a computer;
   defining branch states of tensor variables in the computational graph;
   defining a data dependency relationship of the tensor variables in the computational graph;
   defining a control dependency relationship of the tensor variables in the computational graph, wherein defining the control dependency relationship comprises:
      defining branch control variables: each branch control variable is a Boolean type variable, and is a computing node containing a branch instruction operation branch jump; when a value of the branch control variable is true, an execution flow jumps to a sub-graph branch, otherwise, nodes following the computing node containing the branch instruction operation branch jump are executed;
      defining the control dependency relationship: when the value assigned to the tensor variable depends on the sub-graph branch controlled by the branch control variable, the tensor variable is controlled dependent on the branch control variable;

defining a post-dominating relationship between the sub-graph branches of the computational graph: if and only if each path of the execution flow during execution from sub-graph $B_i$ branch to a terminal node of the computational graph passes through the sub-graph $B_j$ branch, the sub-graph $B_j$ branch post-dominates the sub-graph $B_i$ branch;

defining affect regions of the branch control variables: the affect region of a branch control variable starts from the sub-graph branch where the branch control variable is located and ends at the post-dominating sub-graph branch where the branch control variable is located, and the post-dominating sub-graph branch needs to synchronize threads of different branches diverged at the branch where the branch control variable is located; and defining the control dependency relationship: if and only if the tensor variable is located within the affect region of the branch control variable and the tensor variable can be propagated to the post-dominating sub-graph branch, the tensor variable is controlled dependent on the branch control variable, and the post-dominating sub-graph branch synchronizes the threads on different branches diverged at the branch;

building a data dependency relationship graph of the tensor variables in the computational graph;

building a control dependency relationship graph of the tensor variables in the computational graph; and transforming control dependencies into data dependencies, wherein transforming the control dependencies comprises:

amplifying, using the branch control variables, routing selectors correctly defined for the tensor variables;

synchronizing the tensor variables of different threads outside the affect regions of the branch control variables, wherein synchronizing the tensor variables comprises when life cycle of the tensor variable is not within the affect region of the branch control variable, the routing selector correctly defined for the tensor variable is amplified using the branch control variable to synchronize the values of the tensor variable that are contained in different branch threads; and building connected edges for transforming the control dependencies of the tensor variables outside the affect regions of the branch control variables to obtain data dependencies.

2. The intermediate representation method for parallel execution of graph computation according to claim 1, wherein defining the branch states of the tensor variables comprises:

defining divergent branch states of the tensor variables: when a tensor variable in the computational graph has different values in different parallel threads, the tensor variable is in a divergent branch state; and defining unified branch states of the tensor variables: when a tensor variable in the computational graph has the same value in different parallel threads, the tensor variable is in a unified branch state.

3. The intermediate representation method for parallel execution of graph computation according to claim 1, wherein defining the data dependency relationship comprises: when assignment relationship between an output tensor variable and an input tensor variable that is contained in a node of the computational graph is a relationship expression of the output tensor variable with respect to the input tensor variable, data of the output tensor variable depends on the input tensor variable.

4. The intermediate representation method for parallel execution of graph computation according to claim 1, wherein building the data dependency relationship graph comprises:

creating nodes of the data dependency relationship graph; building a node for each tensor variable in the computational graph in sequence according to topological structure sequence of the computational graph; and creating edges of the data dependency relationship graph; when data of tensor variable v depends on tensor variable u, building a connected edge pointing from the tensor variable u to the tensor variable v, a plurality of connected edges forming the data dependency relationship graph.

5. The intermediate representation method for parallel execution of graph computation according to claim 1, wherein building the control dependency relationship graph comprises:

analyzing the post-dominating sub-graph branches of the branches where the branch control variables are located;

analyzing the affect regions of the branch control variables; and building connected edges in the control dependency relationship graph within the affect regions where the tensor variables are controlled dependent on the branch control variables.

6. An intermediate representation apparatus for parallel execution of graph computation, comprising a memory and one or more processors, the memory storing executable codes, and the one or more processors executing the executable codes to implement the intermediate representation method for parallel execution of graph computation according to claim 1.

7. A non-transitory computer-readable storage medium storing a program that, when executed by a processor, implements the intermediate representation method for parallel execution of graph computation according to claim 1.

* * * * *